United States Patent Office.

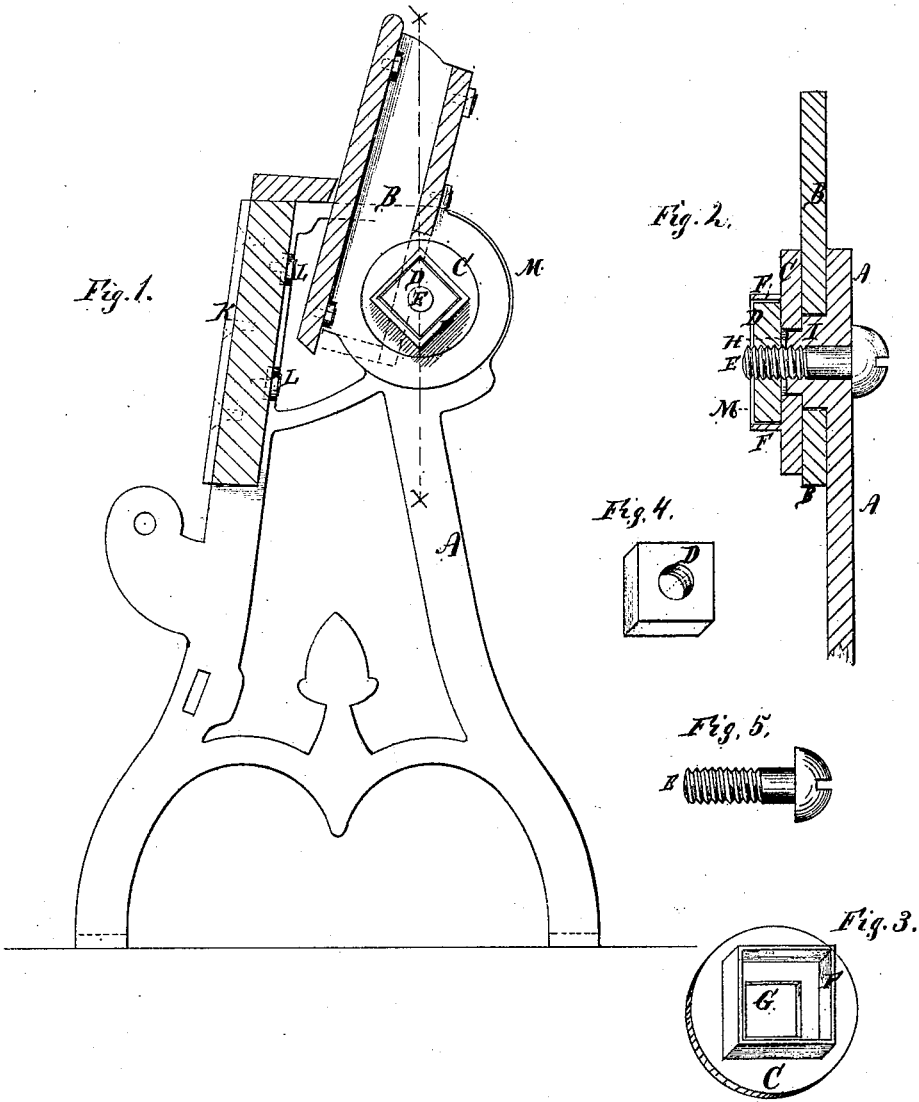

JOHN F. PIEHL, OF RICHMOND, INDIANA.

Letters Patent No. 102,317, dated April 26, 1870.

IMPROVED SCHOOL-DESK.

The Schedule referred to in these Letters Patent and making part of the same

I, JOHN F. PIEHL, of the city of Richmond, county of Wayne and State of Indiana, have invented certain Improvements in School-Desks, of which the following is a specification.

Nature and Object of the Invention.

The nature of my invention consists in the means used for securing the joint on which the desk vibrates, and using the same in connection with the desk and its supports or end pieces, when said end pieces are secured to the back-board by means of ears at the back side and a long flange at the front side, the object being to have a more convenient joint that may be adjusted by means of a common screw-driver from the outside, as it would be very inconvenient to operate on a nut inside of the desk with a wrench.

A further object, also, is to produce a more permanent desk, using the joint in connection with the flange and ears, as hereafter described.

Description of the Accompanying Drawings.

Figure 1 is a section of my desk, in which is embodied my invention, showing one of the cast-iron end pieces, with the desk turned up.

Figure 2 is a vertical section, showing my joint as cut in two at the line $x$.

Figure 3 is a washer with a square flange on it.

Figure 4 is a nut.

Figure 5 is a screw.

General Description.

The same letters refer to corresponding parts in the several figures.

A is a cast-iron end piece, with a circle at its back and over the hind foot; two of these pieces being required, one made the reverse of the other.

B is a cast-iron end for the desk, and has a round hole to fit on the hub I. There are also two of these pieces, one made the reverse of the other, to which the lid, bottom, and back of the desk are secured by means of wood-screws.

C is a washer with a flange, F, attached.

D is a nut.

E is a screw.

F is a flange.

G, square hole in the washer C.

H is a square at the inner end of the hub I, on which the hole G fits.

I is a round hub on the inside of the upright A.

K is a flange at the front of the casting or upright A.

L L L are ears.

M is a joint.

Operation.

It will be seen that, by slipping the piece B onto the hub I, and placing the washer C on the square H, and placing the nut D into the box formed by the flange F, a screw, E, is inserted from the outside, and the joint is drawn together, so that, when the desk is turned on the joint, it will stand at any desired point.

I do not claim a folding desk, as I am aware they have before been used. Neither do I claim a joint simply composed of washers, and nut and bolt.

I am aware of the joint used by H. E. Gillet for his seat. I do not claim a joint constructed as his, with a square bolt and nut on the end, with washers. Neither do I claim a joint formed of a hub on which the desk turns; but

What I claim as my invention is—

1. Hinging the desk to the standards or uprights A by means of the joint M, when composed of the hub I, piece B, washer C, (as constructed,) with its flange F, nut D, and screw E, when all the parts are constructed and arranged to operate as herein described, for the purposes specified.

2. In combination with the above, the flange K and ears L L, for the purposes specified.

JOHN X F. PIEHL.
mark.

Witnesses:
WILLIAM P. ERWIN,
JAMES M. HAYS.